(12) United States Patent
Hwang et al.

(10) Patent No.: US 12,546,882 B2
(45) Date of Patent: Feb. 10, 2026

(54) CAMERA-RADAR SENSOR FUSION USING LOCAL ATTENTION MECHANISM

(71) Applicant: Waymo LLC, Mountain View, CA (US)

(72) Inventors: Jyh-Jing Hwang, Mountain View, CA (US); Henrik Kretzschmar, Mountain View, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 525 days.

(21) Appl. No.: 18/076,723

(22) Filed: Dec. 7, 2022

(65) Prior Publication Data

US 2023/0213643 A1 Jul. 6, 2023

Related U.S. Application Data

(63) Continuation-in-part of application No. 17/569,385, filed on Jan. 5, 2022, now abandoned.

(51) Int. Cl.
*G06V 10/80* (2022.01)
*G01S 7/41* (2006.01)
(Continued)

(52) U.S. Cl.
CPC ............ *G01S 13/867* (2013.01); *G01S 7/417* (2013.01); *G01S 13/89* (2013.01); *G06T 7/194* (2017.01);
(Continued)

(58) Field of Classification Search
CPC ........ G01S 13/867; G01S 7/417; G01S 13/89; G01S 13/931; G06T 7/194; G06T 7/50;
(Continued)

(56) References Cited

U.S. PATENT DOCUMENTS 12,007,728 B1 * 6/2024 Mohta .................... G06F 30/27
2020/0218979 A1 * 7/2020 Kwon ...................... G06N 3/08
(Continued)

OTHER PUBLICATIONS

Ouyang, Z., Feng, Y., He, Z., Hao, T., Dai, T., & Xia, S. T. (Jul. 2019). Attentiondrop for convolutional neural networks. In 2019 IEEE International Conference on Multimedia and Expo (ICME) (pp. 1342-1347). IEEE. (Year: 2019).*

(Continued)

*Primary Examiner* — Gregory A Morse
*Assistant Examiner* — Renae A Bitor
(74) *Attorney, Agent, or Firm* — Fish & Richardson P.C.

(57) ABSTRACT

Methods, computer systems, and apparatus, including computer programs encoded on computer storage media, for processing sensor data. In one aspect, a method includes obtaining image data representing a camera sensor measurement of a scene; obtaining radar data representing a radar sensor measurement of the scene; generating a feature representation of the image data; generating a respective initial depth estimate for each of a subset of the plurality of pixels; generating a feature representation of the radar data; for each of the subset of the plurality of pixels, generating a respective adjusted depth estimate for the pixel using the initial depth estimate for the pixel and the radar feature vectors for a corresponding subset of the plurality of radar reflection points; generating a fused point cloud that includes a plurality of three-dimensional data points; and processing the fused point cloud to generate an output that characterizes the scene.

24 Claims, 7 Drawing Sheets

(51) Int. Cl.
| | |
|---|---|
| *G01S 13/86* | (2006.01) |
| *G01S 13/89* | (2006.01) |
| *G06T 7/194* | (2017.01) |
| *G06T 7/50* | (2017.01) |
| *G06V 10/82* | (2022.01) |
| *G06V 20/56* | (2022.01) |

(52) U.S. Cl.
CPC ............... *G06T 7/50* (2017.01); *G06V 10/80* (2022.01); *G06V 10/82* (2022.01); *G06T 2207/10028* (2013.01); *G06T 2207/20084* (2013.01); *G06T 2207/20221* (2013.01); *G06T 2207/30252* (2013.01); *G06V 20/56* (2022.01)

(58) Field of Classification Search
CPC . G06T 2207/10028; G06T 2207/20084; G06T 2207/20221; G06T 2207/30252; G06T 5/50; G06T 5/60; G06T 7/11; G06V 10/80; G06V 10/82; G06V 20/56
See application file for complete search history.

(56) References Cited

U.S. PATENT DOCUMENTS

| | | | | |
|---|---|---|---|---|
| 2020/0286247 | A1* | 9/2020 | Niesen | G01S 17/89 |
| 2020/0301013 | A1* | 9/2020 | Banerjee | G01S 17/931 |
| 2022/0026557 | A1* | 1/2022 | Arbabian | G01S 13/726 |
| 2022/0357441 | A1* | 11/2022 | Ansari | G01S 13/867 |

OTHER PUBLICATIONS

Ba et al., "Layer normalization," CoRR, Jul. 21, 2016, arXiv:1607.06450, 14 pages.

Bijelic et al., "Seeing through fog without seeing fog: Deep multimodal sensor fusion in unseen adverse weather," Proceedings of the IEEE/CVF Conference on Computer Vision and Pattern Recognition (CVPR), 2020, pp. 11682-11692.

Brazil et al., "M3D-RPN: Monocular 3D region proposal network for object. detection," roceedings of the IEEE/CVF International Conference on Computer Vision (ICCV), 2019, pp. 9287-9296.

Casser et al., "Depth prediction without the sensors: Leveraging structure for unsupervised learning from monocular videos," Proceedings of the AAAI conference on artificial intelligence, Jul. 17, 2019, 33(01):8001-8008.

Chen et al., "Monocular 3D object detection for autonomous driving," Proceedings of the IEEE Conference on Computer Vision and Pattern Recognition (CVPR), 2016, pp. 2147-2156.

Chen et al., "Monopair: Monocular 3D object detection using pairwise spatial relationships," Proceedings of the IEEE/CVF Conference on Computer Vision and Pattern Recognition (CVPR), 2020, pp. 12093-12102.

Chen et al., "Multi-view 3D object detection network for autonomous driving," Proceedings of the IEEE Conference on Computer Vision and Pattern Recognition (CVPR), 2017, pp. 1907-1915.

Ding et al., "Learning depth-guided convolutions for monocular 3D object detection," Proceedings of the IEEE/CVF Conference on Computer Vision and Pattern Recognition (CVPR) Workshops, 2020, pp. 1000-1001.

Graham et al., "Submanifold sparse convolutional networks," CoRR, arXiv:1706.01307, Jun. 6, 2017, 10 pages.

Huang et al., "EPNet: Enhancing point features with image semantics for 3D object detection," European Conference on Computer Vision, Nov. 16, 2020, pp. 35-52.

Ioffe et al., "Batch normalization: Accelerating deep network training by reducing internal covariate shift," Proceedings of the 32nd International Conference on Machine Learning, 2015, 37:448-456.

Kim et al., "GRIF Net: Gated region of interest fusion network for robust 3D object detection from radar point cloud and monocular image," IEEE/RSJ International Conference on Intelligent Robots and Systems (IROS), Oct. 24, 2020, pp. 10857-10864.

Kingma et al., "Adam: A method for stochastic optimization," CoRR, Dec. 22, 2014, arXiv:1412.6980, 15 pages.

Lang et al., "Pointpillars: Fast encoders for object detection from point clouds," Proceedings of the IEEE/CVF Conference on Computer Vision and Pattern Recognition (CVPR), 2019, pp. 12697-12705.

Li et al., "RTM3D: Real-time monocular 3D detection from object keypoints for autonomous driving," European Conference on Computer Vision, Dec. 3, 2020, 11 pages.

Liang et al., "Deep continuous fusion for multi-sensor 3D object detection," Proceedings of the European Conference on Computer Vision (ECCV), 2018, pp. 641-656.

Lim et al., "Radar and camera early fusion for vehicle detection in advanced driver assistance systems," Machine Learning for Autonomous Driving Workshop at the 33rd Conference on Neural Information Processing Systems, 2019, 11 pages.

Lin et al., "Feature pyramid networks for object detection," Proceedings of the IEEE Conference on Computer Vision and Pattern Recognition (CVPR), 2017, pp. 2117-2125.

Lin et al., "Focal loss for dense object detection," Proceedings of the IEEE International Conference on Computer Vision (ICCV), 2017, pp. 2980-2988.

Liu et al., "Reinforced axial refinement network for monocular 3D object detection," European Conference on Computer Vision, Nov. 19, 2020, 17 pages.

Ma et al., "Rethinking pseudo-LiDAR representation," European Conference on Computer Vision, Nov. 28, 2020, 21 pages.

Major et al., "Vehicle detection with automotive radar using deep learning on range-azimuth-doppler tensors," Proceedings of the IEEE/CVF International Conference on Computer Vision (ICCV), 2019, pp. 0-0.

Manhardt et al., "ROI-10D: Monocular lifting of 2D detection to 6D pose and metric shape," Proceedings of the IEEE/CVF Conference on Computer Vision and Pattern Recognition (CVPR), 2019, pp. 2069-2078.

Mousavian et al., "3D bounding box estimation using deep learning and geometry," Proceedings of the IEEE Conference on Computer Vision and Pattern Recognition (CVPR), 2017, pp. 7074-7082.

Nabati et al., "Centerfusion: Center-based radar and camera fusion for 3D object detection," Proceedings of the IEEE/CVF Winter Conference on Applications of Computer Vision (WACV), 2021, pp. 1527-1536.

Nobis et al., "Radar voxel fusion for 3D object detection," Applied Sciences, Jun. 17, 2021, 11(12):5598.

Park et al., "Is pseudo-lidar needed for monocular 3D object detection?," Proceedings of the IEEE/CVF International Conference on Computer Vision (ICCV), 2021, pp. 3142-3152.

Piergiovanni et al., "4D-Net for learned multimodal alignment," Proceedings of the IEEE/CVF International Conference on Computer Vision (ICCV), 2021, pp. 15435-15445.

Qi et al., "Frustum pointnets for 3D object detection from RGB-D data," Proceedings of the IEEE Conference on Computer Vision and Pattern Recognition (CVPR), 2018, pp. 918-927.

Qi et al., "Pointnet++: Deep hierarchical feature learning on point sets in a metric space," Advances in Neural Information Processing Systems 30, 2017, 10 pages.

Reading et al., "Categorical depth distribution network for monocular 3D object detection," Proceedings of the IEEE/CVF Conference on Computer Vision and Pattern Recognition (CVPR), 2021, pp. 8555-8564.

Roddick et al., "Orthographic feature transform for monocular 3D object detection," CoRR, Nov. 20, 2018, arXiv:1811.08188, 10 pages.

Ronneberger et al., "U-net: Convolutional networks for biomedical image segmentation," International Conference on Medical image computing and computer-assisted intervention, Nov. 18, 2015, pp. 234-241.

Schumann et al., "Semantic segmentation on radar point clouds," 2018 21st International Conference on Information Fusion (FUSION), Jul. 10-13, 2018, pp. 2179-2186.

Sheeny et al., "Radiate: A radar dataset for automotive perception in bad weather," 2021 IEEE International Conference on Robotics and Automation (ICRA), May 30, 2021, 7 pages.

(56) References Cited

OTHER PUBLICATIONS

Shi et al., "Distance-normalized united representation for monocular 3D object detection," European Conference on Computer Vision, 2020, pp. 91-107.

Shi et al., "Pointrcnn: 3D object proposal generation and detection from point cloud," Proceedings of the IEEE/CVF Conference on Computer Vision and Pattern Recognition (CVPR), 2019, pp. 770-779.

Simonelli et al., "Disentangling monocular 3D object detection," Proceedings of the IEEE/CVF International Conference on Computer Vision (ICCV), 2019, pp. 1991-1999.

Simonelli et al., "Towards generalization across depth for monocular 3D object detection," European Conference on Computer Vision, Nov. 17, 2020, pp. 767-782.

Srivastava et al., "Dropout: a simple way to prevent neural networks from overfitting," The journal of machine learning research, 2014, 15(1): 1929-1958.

Srivastava et al., "Learning 2D to 3D lifting for object detection in 3D for autonomous vehicles," 2019 IEEE/RSJ International Conference on Intelligent Robots and Systems (IROS), Nov. 3-8, 2019, pp. 4504-4511.

Sun et al., "RSN: Range Sparse Net for Efficient, Accurate LiDAR 3D Object Detection," Proceedings of the IEEE/CVF Conference on Computer Vision and Pattern Recognition (CVPR), 2021, pp. 5725-5734.

Sun et al., "Scalability in perception for autonomous driving: Waymo Open Dataset," Proceedings of the IEEE/CVF Conference on Computer Vision and Pattern Recognition (CVPR), 2020, pp. 2446-2454.

Vaswani et al., "Attention is all you need," Advances in Neural Information Processing Systems 30, 2017, 11 pages.

Vladimir, et al., "Hitnet: Hierarchical iterative tile refinement network for real-time stereo matching," Proceedings of the IEEE/CVF Conference on Computer Vision and Pattern Recognition, 2021, pp. 14362-14372.

Vora et al., "Pointpainting: Sequential fusion for 3D object detection," Proceedings of the IEEE/CVF Conference on Computer Vision and Pattern Recognition (CVPR), 2020, pp. 4604-4612.

Wang et al., "Frustum convnet: Sliding frustums to aggregate local pointwise features for amodal 3D object detection," 2019 IEEE/RSJ International Conference on Intelligent Robots and Systems (IROS), Nov. 3-8, 2019, 8 pages.

Wang et al., "Pointaugmenting: Cross-modal augmentation for 3D object detection," Proceedings of the IEEE/CVF Conference on Computer Vision and Pattern Recognition (CVPR), 2021, pp. 11794-11803.

Wang et al., "Pseudo-lidar from visual depth estimation: Bridging the gap in 3D object detection for autonomous driving," Proceedings of the IEEE/CVF Conference on Computer Vision and Pattern Recognition (CVPR), 2019, pp. 8445-8453.

Weng et al., "Monocular 3D object detection with pseudo-lidar point cloud," Proceedings of the IEEE/CVF International Conference on Computer Vision (ICCV), 2019, pp. 0-0.

Yan et al., "Second: Sparsely embedded convolutional detection," Sensors, Oct. 6, 2018, 18(10):3337.

You et al., "Pseudo-liDAR++: Accurate depth for 3D object detection in autonomous driving," CoRR, Jun. 14, 2019, arXiv:1906.06310, 22 pages.

Zhou et al., "End-to-end multi-view fusion for 3D object detection in LiDAR point clouds," Proceedings of the Conference on Robot Learning, 2020, 100:923-932.

Zhou et al., "IoU loss for 2D/3D object detection," 2019 International Conference on 3D Vision (3DV), Sep. 16-19, 2019, 10 pages.

Zhou et al., "Objects as points," CoRR, Apr. 16, 2019, arXiv:1904.07850, 12 pages.

\* cited by examiner

CAMERA-RADAR SENSOR FUSION USING LOCAL ATTENTION MECHANISM

CROSS-REFERENCE TO RELATED APPLICATIONS

This application claims priority to U.S. Provisional Application No. 63/317,469, filed on Mar. 7, 2022, and this application is a continuation-in-part of and claims priority to U.S. patent application Ser. No. 17/569,385, filed on Jan. 5, 2022. The disclosures of the prior applications are considered part of and are incorporated by reference in the disclosure of this application.

BACKGROUND

This specification relates to processing sensor data, e.g., camera sensor data or radar sensor data, using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes (i) image data representing a camera sensor measurement of a scene captured by one or more camera sensors and (ii) radar data representing a radar sensor measurement of the scene captured by one or more radar sensors to generate a system output that characterizes the scene, e.g., an object detection output that identifies locations of one or more objects in the scene or a different kind of output that characterizes different properties of objects in the scene. For example, the one or more camera sensors and the one or more radar sensors can be sensors of an autonomous vehicle (or a semi-autonomous vehicle), e.g., a land, air, or sea vehicle, and the scene can be a scene that is in the vicinity of the autonomous vehicle. The system output can then be used to make autonomous driving decisions for the vehicle, to display information to operators or passengers of the vehicle, or both.

The subject matter described in this specification can be implemented in particular embodiments so as to realize one or more of the following advantages. This specification discloses a sensor fusion system that is robust and fault tolerant. In some examples, the sensor fusion system can continue operating properly even in the cases of inclement weather conditions, or sensor failure, e.g., where only one camera or one radar sensor is available for use in generating measurements. In addition, in contrast to existing approaches for camera radar sensor fusion which oftentimes fail to guarantee a robust spatial alignment between sensor data collected by using the two different sensors, the use of attention mechanism during sensor fusion allows for the described system to effectively make use of radar features to more accurately predict pixel depths when generating a fused point cloud that will be processed using a neural network. By making use of radar features to apply adjustments to pixel depth predictions, the fused point cloud preserves both the resolution to identify object characteristics or features from the image data, as well as object distance and velocity information from the radar data. This allows for a downstream neural network that is implemented by the system and that processes the representation to generate task outputs, e.g., object detection or object classification outputs, that are more accurate and have higher precision than conventional approaches. When deployed onboard a vehicle, the system described herein may enable the on-board system of the vehicle to make planning decisions that cause the vehicle to travel along a safe and smooth trajectory, especially in long-range, highway driving scenarios.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
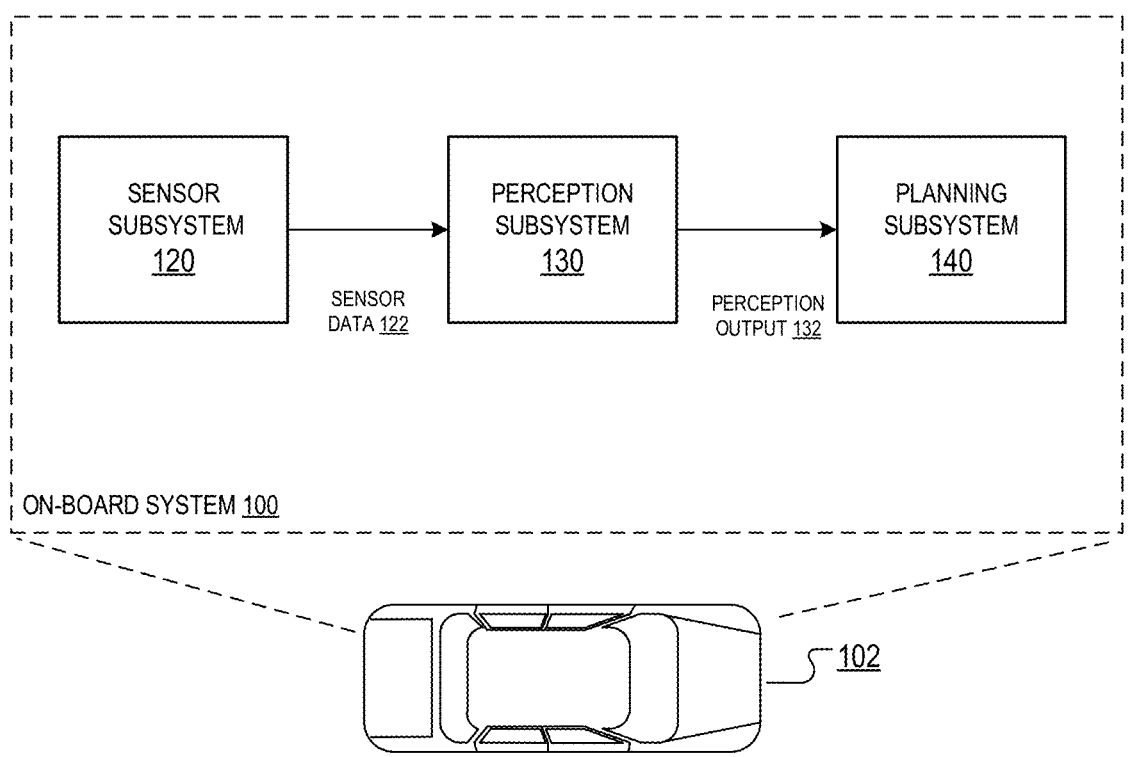
FIG. 1 shows a block diagram of an example on-board system.

This specification describes a system implemented as computer programs on one or more computers in one or more locations that processes (i) image data representing a camera sensor measurement of a scene captured by one or more camera sensors and (ii) radar data representing a radar sensor measurement of the scene captured by one or more radar sensors to generate a system output that characterizes the scene, e.g., an object detection output that identifies locations of one or more objects in the scene or a different kind of output that characterizes different properties of objects in the scene. For example, the one or more camera sensors and the one or more radar sensors can be sensors of an autonomous vehicle (or a semi-autonomous vehicle), e.g., a land, air, or sea vehicle, and the scene can be a scene that is in the vicinity of the autonomous vehicle. The system output can then be used to make autonomous driving decisions for the vehicle, to display information to operators or passengers of the vehicle, or both. An example autonomous vehicle may be implemented in or may take the form of an automobile, delivery vehicle, or semi-truck. Other vehicles are possible as well. Further, in some examples, the system might not be physically implemented on a vehicle.

The radar sensors provide reasonably accurate measurements of object distance and velocity in various weather conditions. However, radar data typically lacks elevation measurements, i.e., information about the height of a detected object relative to the ground surface. Camera sensors, which are capable of supplying this elevation information, however, typically fail to directly provide object depth measurements, i.e., information about the distance of a detected object relative to the camera sensor. The cues of object elevation and depth information may provide sufficient characteristics for classification or detection of different objects. Given the complementary properties of the two sensors, data from the two sensors can be combined (referred to as "fusion") in a single system for improved performance of other components implemented with the system that processes the fused sensor data to generate the system output that characterizes the scene.

Some existing sensor fusion systems attempt to spatially associate the pixels in the image data with the radar reflection points in the radar data by projecting the radar reflection points onto a camera frame, e.g., by computing a series of transformation or rotation matrices. However, because accurately estimating the values for the matrix variables is difficult, the projection of radar reflection points, and correspondingly, the resulting spatial association between the pixels and the radar reflection points can be inaccurate. In some cases, pixels and radar reflection points that correspond to different objects in the environment may be combined together in a way that misleads or otherwise confuses (and therefore downgrades the performance of) a downstream neural network that processes the fused representation to generate the output that characterizes the scene.

In contrast to existing approaches for camera radar sensor fusion which oftentimes fail to guarantee a robust spatial alignment between sensor data collected by using the two different sensors, the use of attention mechanism during sensor fusion allows for the described techniques to effectively make use of radar features to more accurately predict pixel depths when generating a fused point cloud that will be processed using a neural network. By making use of radar features to apply adjustments to pixel depth predictions, the fused point cloud preserves both the resolution to identify object characteristics or features from the image data, as well as object distance and velocity information from the radar data. This allows for a downstream neural network that processes the representation to generate task outputs, e.g., object detection or object classification outputs, that are more accurate and have higher precision than conventional approaches. When deployed onboard a vehicle, the techniques described herein may enable the on-board system of the vehicle to make planning decisions that cause the vehicle to travel along a safe and smooth trajectory.

FIG. 1 is a block diagram of an example on-board system 100. The on-board system 100 is physically located on-board a vehicle 102. The vehicle 102 in FIG. 1 is illustrated as an automobile, but the on-board system 100 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with a detected object, e.g., a pedestrian, a cyclist, or another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

While the vehicle 102 is illustrated in FIG. 1 as being an automobile, the vehicle 102 can be any appropriate vehicle that uses sensor data to make fully-autonomous or semi-autonomous operation decisions. For example, the vehicle 102 can be an automobile, delivery vehicle, semi-truck, watercraft or an aircraft. Moreover, the on-board system 100 can include components additional to those depicted in FIG. 1 (e.g., a control subsystem or a user interface subsystem).

The on-board system 100 includes a sensor subsystem 120 which enables the on-board system 100 to "see" the environment in a vicinity of the vehicle 102. The sensor subsystem 120 includes one or more sensors, some of which are configured to receive reflections of electromagnetic radiation from the environment in the vicinity of the vehicle 102. For example, the sensor subsystem 120 can include one or more radar sensors that are configured to detect reflections of radio waves. As another example, the sensor subsystem 120 can include one or more camera sensors that are configured to detect reflections of visible light. In some of these examples, the radar sensor(s) and the camera sensor(s) can be oriented to capture their respective versions of the same scene of the environment in the vicinity of the vehicle 102, e.g., the scene in front of the vehicle 102, and also possibly to the sides of or behind and the vehicle 102.

The sensor subsystem 120 repeatedly (i.e., at each of multiple time points) uses raw sensor measurements, data derived from raw sensor measurements, or both to generate sensor data 122. The raw sensor measurements indicate the directions, intensities, and distances travelled by reflected radiation. For example, a sensor in the sensor subsystem 120 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

In particular, the sensor data 122 includes image data that is generated by using the one or more camera sensors of the vehicle 102 and that characterizes the latest state of an environment (i.e., an environment at the current time point) in the vicinity of the vehicle 102. An image can include a plurality of different two-dimensional image pixels, i.e., a plurality of different image pixels arranged in a two-dimensional coordinate system. Each image pixel can spatially map to one or more real-world points in the environment, which are usually measured in a three-dimensional world coordinate system. In one example, an image pixel with coordinates (x1, y1) can map to a real-world point with coordinates (x2, y2, z2). Each image pixel can have one or more color channels (or other properties). A color channel can be one of a plurality of predetermined options, determined according to a desired color space. In the example of an RGB color space, each image pixel can include a red, a green, and a blue color channel.

The sensor data 122 also includes radar data generated by using the one or more radar sensors of the vehicle that characterizes the latest state of the environment in the vicinity of the vehicle 102. The radar data can include a two-dimensional point cloud, with each point in the point cloud being referred to as a radar reflection point. Every time an object in the environment reflects the radar signal transmitted by the one or more radar sensors, a radar reflection point in the point cloud may be created. In other words, the radar data can be a collection of radar reflection points defined in a two-dimensional coordinate system, e.g., a polar coordinate system in which each radar reflection point is defined along a distance dimension and an azimuth angle dimension. As similarly described above, each radar reflection point can spatially map to one or more real-world points in the environment, which are usually measured in a three-dimensional world coordinate system. In one example, a radar reflection point with coordinates $(r, \theta)$ can map to a real-world point (on a surface of an object) with coordinates $(x, y, z)$. Each radar reflection point can optionally have one or more values that each represent a property of the radar reflection point, e.g., the relative speed of the point in relation to the radar sensor as measured using Doppler effect.

The on-board system 100 can provide the sensor data 122 generated by the sensor subsystem 120 to a perception subsystem 130 for use in generating perception outputs 132.

The perception subsystem 130 implements components that perform a perception task, e.g., that identify objects within a vicinity of the vehicle or classify already identified objects or both. The components typically include one or more fully-learned machine learning models. A machine learning model is said to be "fully-learned" if the model has been trained to compute a desired prediction when performing a perception task. In other words, a fully-learned model generates a perception output based solely on being trained on training data rather than on human-programmed decisions. For example, the perception output 132 may be a classification output that includes a respective object score corresponding to each of one or more object categories, each object score representing a likelihood that the input sensor data characterizes an object belonging to the corresponding object category. As another example, the perception output 132 can be an object detection output that includes data defining one or more bounding boxes (e.g., two-dimensional or three-dimensional bounding boxes) in the sensor data 122, and optionally, for each of the one or more bounding boxes, a respective confidence score that represents a likelihood that an object belonging to an object category from a set of one or more object categories is present in the region of the environment shown in the bounding box. Examples of object categories include pedestrians, cyclists, or other vehicles near the vicinity of the vehicle 102 as it travels on a road.

The on-board system 100 can provide the perception outputs 132 to a planning subsystem 140. When the planning subsystem 140 receives the perception outputs 132, the planning subsystem 140 can use the perception outputs 132 to generate planning decisions which plan the future trajectory of the vehicle 102. The planning decisions generated by the planning subsystem 140 can include, for example: yielding (e.g., to pedestrians identified in the perception outputs 132), stopping (e.g., at a "Stop" sign identified in the perception outputs 132), passing other vehicles identified in the perception outputs 132, adjusting vehicle lane position to accommodate a bicyclist identified in the perception outputs 132, slowing down in a school or construction zone, merging (e.g., onto a highway), and parking. The planning decisions generated by the planning subsystem 140 can be provided to a control system of the vehicle 102. The control system of the vehicle can control some or all of the operations of the vehicle by implementing the planning decisions generated by the planning system. For example, in response to receiving a planning decision to apply the brakes of the vehicle, the control system of the vehicle 102 may transmit an electronic signal to a braking control unit of the vehicle. In response to receiving the electronic signal, the braking control unit can mechanically apply the brakes of the vehicle.

Instead of or in addition to using the perception outputs 132 to generate the planning decisions which plan the future trajectory of the vehicle 102, the planning subsystem 140 can generate a semi-autonomous recommendation for a human driver to apply the brakes or to adjust the trajectory of the vehicle. For example, the recommendation may be presented as an alert message to a driver of the vehicle 102 on an on-board display device that is part of a user interface subsystem of the on-board system 100.

In order for the planning subsystem 140 to generate planning decisions which cause the vehicle 102 to travel along a safe and comfortable trajectory, the on-board system 100 must provide the planning subsystem 140 with high quality perception outputs 132 that accurately identify objects within the scene of the environment captured by the one or more camera sensors and the one or more radar sensors. The radar sensors provide reasonably accurate measurements of object distance and velocity in various weather conditions. However, radar data typically lacks elevation measurements, i.e., information about the height of a detected object relative to the ground surface. Camera sensors, which are capable of supplying this elevation information, however, typically fail to directly provide object depth measurements, i.e., information about the distance of a detected object relative to the camera sensor. The cues of object elevation and depth information may provide sufficient characteristics for classification or detection of different objects. Given the complementary properties of the two sensors, data from the two sensors can be combined (referred to as "fusion") in a single system for improved performance of the various components implemented within the perception subsystem 130.

In particular, the on-board system 100 uses sensor fusion techniques as will be described further below to combine camera and radar sensor data by generating a fused representation of a scene in the form of a three-dimensional point cloud from the respective data captured by using at least a camera sensor and at least a radar sensor, thereby providing information about the scene that may be not be available by using any single sensor. In a three-dimensional coordinate system (e.g., in a local 3-D coordinate system that is different from the 3-D world coordinate system), a point cloud can define the shape of some real or synthetic physical objects in the environment, where each point in the point cloud is defined by three values representing respective coordinates in the coordinate system, e.g., $(x, y, z)$ coordinates. When generating each three-dimensional point cloud, the on-board system 100 alleviates the uncertainty inherent in image pixel depth predictions using a "local attention" mechanism, which allows for the system to more accurately determine depth information from radar data features for image pixels in image data. The fused representation may then be processed using the components implemented within the perception subsystem 130 to generate the perception outputs 132.

Figure 2:
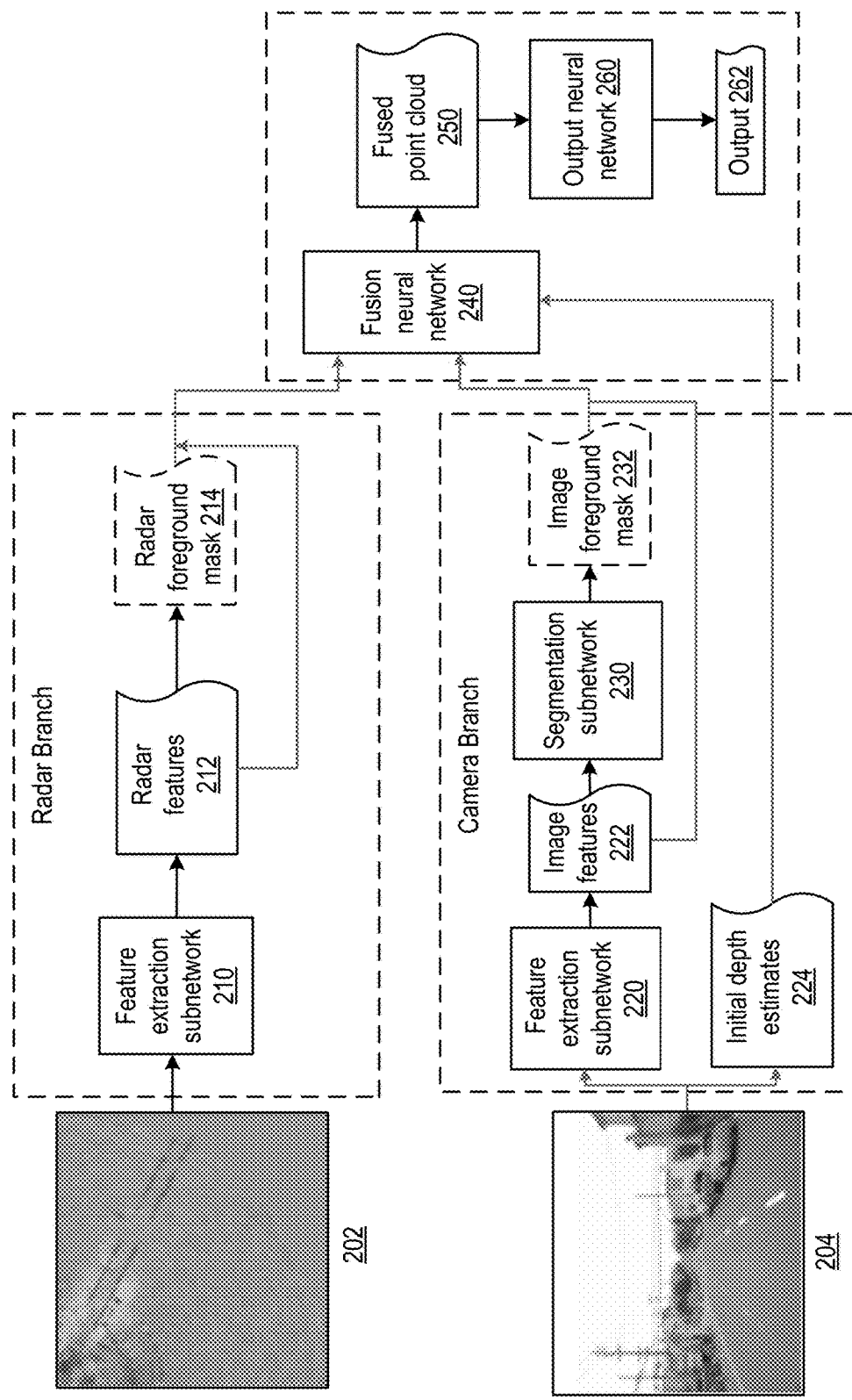
FIG. 2 illustrates an example of generating and processing a fused point cloud of a scene of an environment to generate a system output that characterizes the scene.

FIG. 2 illustrates an example of generating and processing a fused point cloud of a scene of an environment to generate a system output that characterizes the scene.

During the sensor fusion stage, a system, e.g., the on-board system 100 of FIG. 1, processes the radar data 202 and the image data 204 to extract (i) corresponding radar features 212 and image features 222 from the obtained data and to generate (ii) initial depth estimates 224 for each of some or all of the two-dimensional pixels included in the image data that the system then uses to generate the fused point cloud 250. In particular, to accurately determine depth information for the pixel in the image data, the system implements and uses a fusion neural network 240 that is configured to generate the respective adjusted depth estimate for the pixel at least in part by applying an attention mechanism over a corresponding subset of the radar features 212 by using the image features 222 for the pixel to generate a query for the attention mechanism.

During the output stage, the system then processes the fused camera and radar point cloud 250 using an output neural network 260 to generate a network output 262 that characterizes a scene of an environment that is in the vicinity of the vehicle 102, e.g., an object detection output that identifies locations of one or more objects in the scene or a different kind of output that characterizes different properties of objects in the scene.

Figure 3:
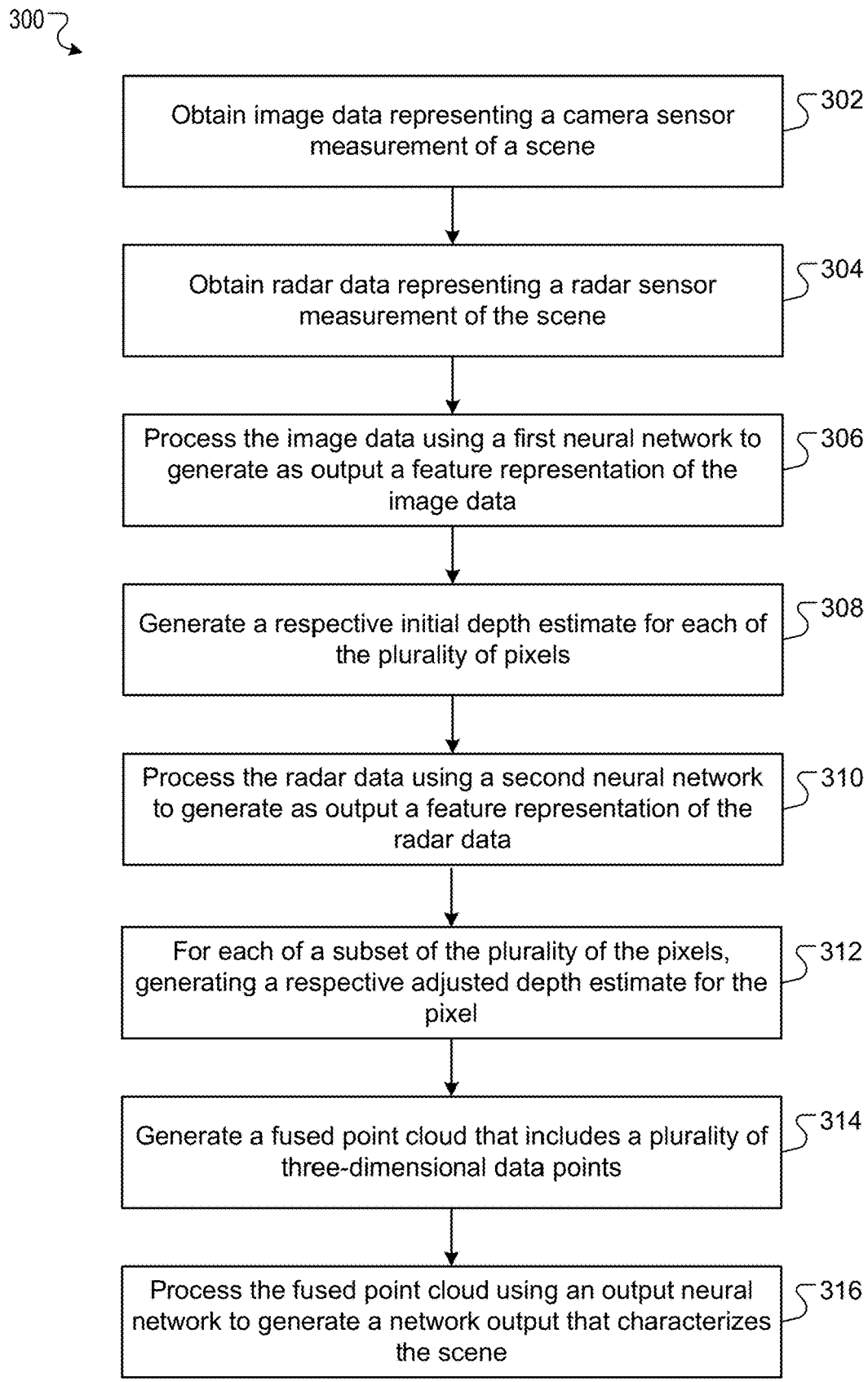
FIG. 3 is a flow diagram of an example process for generating and processing a fused point cloud of a scene of an environment to generate a system output that characterizes the scene.

FIG. 3 is a flow diagram of an example process 300 for generating and processing a fused point cloud of a scene of an environment to generate a system output that characterizes the scene. For convenience, the process 300 will be described as being performed by a system of one or more computers located in one or more locations. For example, an on-board system, e.g., the on-board system 100 of FIG. 1, appropriately programmed in accordance with this specification, can perform the process 300.

The system obtains, i.e., receives or generates, image data representing a camera sensor measurement of a scene captured by a camera sensor (step 302). The image data includes a plurality of two-dimensional pixels each having two-dimensional coordinates (e.g., (x, y)).

The system obtains, i.e., receives or generates, radar data representing a radar sensor measurement of the scene captured by a radar sensor (step 304). The radar data includes a plurality of two-dimensional radar reflection points each having two-dimensional coordinates (e.g., (r, θ)).

The system processes the image data using a first neural network to generate as output a feature representation of the image data (step 306). As used in this specification, a feature representation is an ordered collection of numeric values, e.g., a matrix or vector of floating point or quantized values. In some cases, the feature representation can include a respective vector (referred to as an image feature vector) for each of the plurality of two-dimensional pixels included in the obtained image data.

The first neural network can include one more sub neural networks. For example, as illustrated in the bottom half of FIG. 2, the first neural network can include a feature extraction subnetwork 220 and a segmentation subnetwork 230. When included, the segmentation subnetwork 230 can be used to reduce the overall latency of the system, by filtering out background information from the data that subsequently needs to be processed by the system.

The feature extraction subnetwork 220 can be configured as a convolutional neural network that is configured to process the obtained image data 204 to generate the feature representation 222 of the image data, which can include a respective image feature vector for each of the plurality of two-dimensional pixels included in the image data 204. The feature extraction subnetwork 220 may be any of a variety of convolutional neural networks that are configured to process images. One example lightweight convolutional neural network that can be used as (a backbone architecture of) the feature extraction subnetwork is described in Ronneberger, Olaf, et al. "U-net: Convolutional networks for biomedical image segmentation." International Conference on Medical image computing and computer-assisted intervention. Springer, Cham, 2015.

The segmentation subnetwork 230 is configured to process the image data 204, the feature representation 222 of the image data, or both to generate a mask 232, which identifies the locations of any objects of interest (referred to as foreground objects) in the image data. In the example context of autonomous vehicles, these objects of interest may include moving objects, e.g., other vehicles that are present in the scene of the environment. The segmentation subnetwork 230 can be similarly configured as a convolutional neural network. A mask as described herein may be a digital representation of those areas of an image that have been classified as foreground objects, and those areas that have been classified as background objects. In other words, the system can use the segmentation subnetwork 230 to generate a mask, e.g., a binary mask, that assigns each of the plurality of two-dimensional pixels in the image to be either a foreground pixel (that is part of a foreground object) or a background pixel (that is not part of any foreground object).

The system generates respective initial depth estimates for some or all of the plurality of pixels (step 308). In particular, in some implementations, the system can generate the respective initial depth estimates for all of the pixels included in the image data while in other implementations the system can only generate the respective initial depth estimates for a subset of the plurality of pixels that have been classified as the foreground pixels. Depth estimation for a pixel may include the estimation of absolute or relative distances between the camera sensor and a real-world position in the environment that spatially maps to the pixel, called depth, from the two-dimensional information captured by the camera sensor. A number of aspects of the image data may be used to assist in the estimation of a depth value of each 2-D pixel. For example, perspective geometry or temporal or 2D spatial cues, such as object motion or color, may be used.

In some implementations, the system can generate a respective initial depth estimate for each pixel by making use of analytical depth estimation algorithms or techniques. In other implementations, the system can use a machine learning-based method, e.g., a depth prediction neural network that is configured to process the image data to generate as output the respective initial depth estimate of each of the plurality of pixels. For example, the system can use the neural network architecture (and associated techniques) described in more detail at Casser, Vincent, et al. "Depth prediction without the sensors: Leveraging structure for unsupervised learning from monocular videos." Proceedings of the AAAI conference on artificial intelligence. Vol. 33. No. 01. 2019. As another example, if the image data includes stereoscopic image data that is generated by using a stereo camera sensor, the system can use the neural network architecture described in more detail at Tankovich, Vladimir, et al. "Hitnet: Hierarchical iterative tile refinement network for real-time stereo matching." Proceedings of the IEEE/CVF Conference on Computer Vision and Pattern Recognition. 2021.

The system processes the radar data using a second neural network to generate as output a feature representation of the radar data (step 310). In some cases, the feature representation can include a respective radar feature vector (e.g., a vector of multiple numeric values such as floating point or quantized values) for each of the plurality of radar reflection points.

The second neural network can include one or more sub neural networks. For example, as illustrated in the top half of FIG. 2, the second neural network can include a feature extraction subnetwork 210. The feature extraction subnetwork 210 can be configured as a convolutional neural network that is configured to process the obtained radar data 202 to generate the feature representation 212 of the radar data, which can include a respective radar feature vector for each of the plurality of radar reflection points included in the radar data 202. The feature extraction subnetwork 210 may, but need not, have the same neural network architecture as the feature extraction subnetwork 220 that is used to extract features from the image data 204.

The system can generate a mask 214, e.g., a binary mask, that assigns each of the plurality of radar reflection points included the radar data to be either a foreground radar reflection point (that is part of a foreground object) or a background radar reflection point (that is not part of any foreground object). In some implementations, the second neural network can include another segmentation subnetwork, e.g., similar to the segmentation subnetwork 230 of the first neural network, and the system can do this by using the segmentation neural network that is configured to process the radar data 202, the feature representation 212 of the radar data, or both to generate the mask which identifies the locations of the foreground objects in the radar point cloud, as similarly described above with reference to step 306. In other implementations, the system can use a probabilistic-based approach, e.g., an iterative graph-based segmentation algorithm.

For each of the subset of the plurality of the pixels that have been classified as foreground pixels, the system generates a respective adjusted depth estimate for the pixel using the initial depth estimate for the pixel and the radar feature vectors for a corresponding subset of the plurality of radar reflection points (step 312).

When generating the respective adjusted depth estimate for each foreground pixel, to alleviate the estimation errors in the cases where the initial depth estimate for the pixel is less accurate, the system can additionally generate and use a plurality of candidate initial depth estimates for the pixel. Specifically, for each of the subset of the plurality of the pixels that have been classified as the foreground pixels, the system also generates multiple candidate initial depth estimates for the pixel based on sampling the candidate initial depth estimates along a 3-D camera ray that is cast from the camera sensor to a three-dimensional real-world position having spatial coordinates of the pixel and a depth that is equal to the initial depth estimate. The sampling can be performed in accordance with some predetermined span and/or sampling rates, which may themselves be adjustable hyper-parameters of the system.

Figure 4:
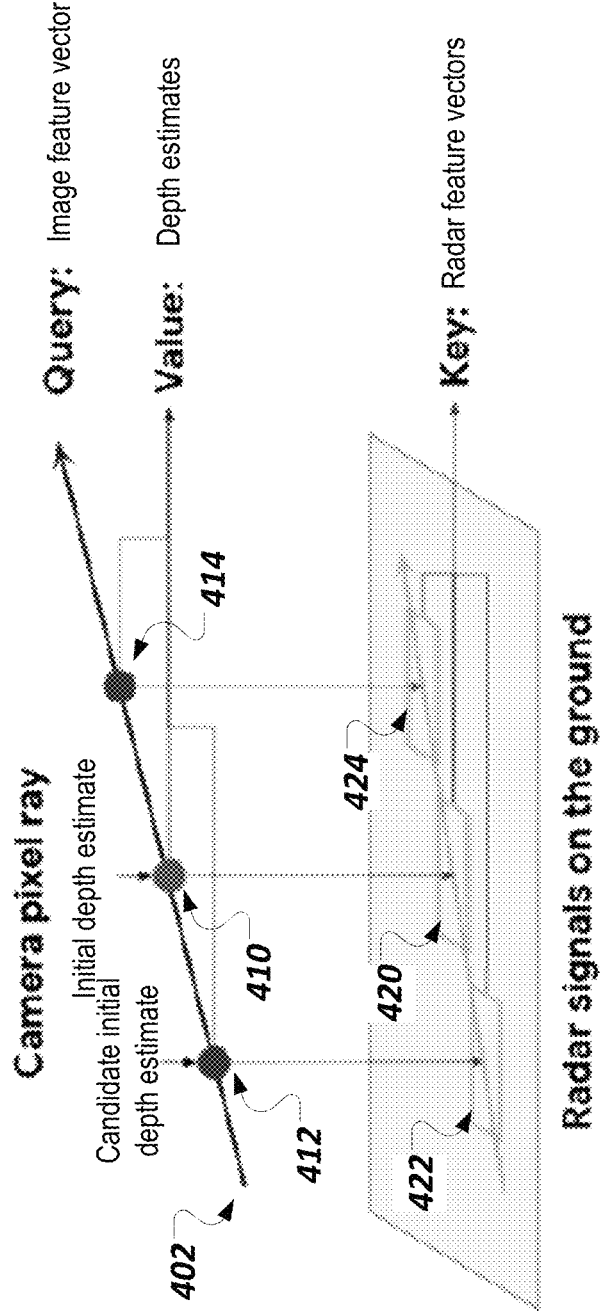
FIG. 4 illustrates an example of generating a respective adjusted depth estimate for a pixel.

FIG. 4 illustrates an example of generating a respective adjusted depth estimate for a pixel. As illustrated, a virtual ray 402 ("camera pixel ray") may cast from the camera sensor to a three-dimensional position 410 which spatially maps to the pixel. That is, the virtual ray 402 that originates from a lens of the camera sensor may pass through the position 410 having spatial coordinates (e.g., x, y, and z coordinates in the three-dimensional world coordinate system) determined from the two-dimensional coordinates of the pixel in the image data and the initial depth estimate that has been generated for the pixel. Along the virtual ray 402, multiple candidate three-dimensional positions, e.g., 3-D positions 412 and 414, can be generated through sampling. Each candidate three-dimensional position specifies a respective candidate initial depth estimate for the pixel which may be different from the initial depth estimate for the pixel specified by the three-dimensional position 410.

The system can then use the radar feature vectors (or information derived from the radar feature vectors or both) of the radar reflection points that have been classified as the foreground radar reflection points to determine an adjustment to the candidate initial depth prediction for the pixel. To further determine which radar reflection points should be used as the corresponding subset of the plurality of radar reflection points to be used when generating the respective adjusted depth estimate for the pixel, the system can determine (i) one or more radar reflection points that spatially map to the three-dimensional position corresponding to the initial depth estimate, or (ii) one or more radar reflection points that spatially map to each of the plurality of candidate three-dimensional positions by using the respective candidate initial depth estimate that is specified by the candidate three-dimensional position.

In the example of FIG. 4, the system can use the radar feature vectors for radar reflection points 420, 422, and 424 to generate the respective adjusted depth estimate for the pixel because, e.g., the three-dimensional position 410 (which has spatial coordinates of the pixel from which an azimuth value of the position may be derived, and a depth value equal to the initial depth estimate) and radar reflection point 420 (which has a depth value and an azimuth value specified by the radar sensor measurements) both have substantially the same depth and azimuth values. Similarly, the candidate three-dimensional position 412 (which has spatial coordinates of the pixel and a depth value equal to the sampled, candidate initial depth estimate) and radar reflection point 422 (which has a depth value specified by the radar sensor measurements) both have substantially the same depth value. In this way, for example, for an image pixel that is part of a vehicle characterized in the image data, the system can match it with one or more other radar feature vectors for one or more radar reflection points that are created by the vehicle.

In some implementations, as illustrated on the right hand side of FIG. 2, the system implements and uses a fusion neural network 240. The fusion neural network may be an attention-based neural network that is configured to process, for each of the subset of the plurality of pixels, a fusion network input that includes the respective initial depth estimate and the other candidate initial depth estimates for the pixel and to generate a fusion network output that specifies the respective adjusted depth estimate for the pixel at least in part by applying an attention mechanism over the radar feature vectors of a corresponding subset of the plurality of radar reflection points by using the image feature vector for the pixel to generate a query for the attention mechanism.

In these implementations, the fusion neural network includes one or more attention layers. As used herein an attention layer is a neural network layer which includes an attention mechanism, for example a scaled dot-product attention mechanism. The attention mechanism maps a query and a set of key-value pairs to an output, where the query, keys, and values are all vectors. The output is computed as a weighted sum of the values, where the weight assigned to each value is computed by a compatibility function of the query with the corresponding key. In scaled dot-product attention, for a given query, the attention layer computes the dot products of the query with all of the keys, divides each of the dot products by a scaling factor, e.g., by the square root of the dimensions of the queries and keys, and then applies a softmax function over the scaled dot products to obtain the weights on the values. The attention layer then computes a weighted sum of the values in accordance with these weights. Thus, for scaled dot-product attention the compatibility function is the dot product and the output of the compatibility function is further scaled by the scaling factor.

In some implementations, the weighted sum that is generated as the output of the attention layer is used as the adjusted depth estimate for a given pixel. In other implementations, the attention layer output can be fed as input to a subsequent neural network layer in the fusion neural network (e.g., another attention layer, or an output layer) for further processing to generate the adjusted depth estimate for the given pixel.

The use of attention mechanisms allows for the fusion neural network to effectively use the radar representation of the radar data to determine, from the initial depth estimates and candidate initial depth estimates for each of the subset of the plurality of pixels, a more accurate depth estimate for the pixel. This can improve the accuracy of the system using the fusion neural network on performing sensor fusion where spatial alignment between different data collected by using two different sensors—camera sensor and radar sensor—is the primary success or failure criteria for the fused representation, as well as for the performance on the perception task that operates on the fused representation.

As illustrated in the example of FIG. 4, in these implementation, for each of the subset of the plurality of pixels, the system can use the image feature vector for the pixel to generate the query for the pixel to be used in the attention mechanism; the radar feature vector for each radar reflection point in the corresponding subset of the plurality of radar reflection points to generate a respective key for the radar reflection point to be used in the attention mechanism; and the respective initial depth estimate and the plurality of candidate initial depth estimates to generate respective values for the pixel to be used in the attention mechanism.

In these implementations, the system can generate the queries and keys by processing the image feature vector and the radar feature vector using one or more neural network layers, e.g., convolutional layers or fully connected layers, respectively. In some of these implementations, positional encodings of the pixels and radar reflection points may be added to the layer outputs when generating the queries and keys.

The system can determine a corresponding attention weight for each respective value for the pixel by computing a dot product between the query for the pixel and each of the respective keys, and generate the respective adjusted depth estimate for the pixel by determining a weighted sum of the respective values for the pixel weighted by the corresponding attention weights for the respective values.

The system generates a fused point cloud that includes a first plurality of three-dimensional data points (step 314). Each first 3-D data point corresponds to a respective one of the subset of the plurality of 2-D pixels in the image data and has a depth value that is equal to the respective adjusted depth estimate for the corresponding pixel. Each first 3-D data point generally has x, y, and z coordinates that are defined with reference to a given coordinate system (e.g., in a local coordinate system) and that can spatially map to one or more real-world points in the environment.

The fused point cloud also includes a second plurality of three-dimensional data points. Each second 3-D data point corresponds to a respective radar reflection point in the radar data, e.g., a respective radar reflection point in the subset of foreground radar reflection points, and has an elevation value that is equal to an elevation estimate for the radar reflection point. Each second 3-D data point has x, y, and z coordinates defined with reference to the same given coordinate system as the first plurality of three-dimensional data points. Similarly, each second 3-D data point can spatially map to one or more real-world points in the environment. To transform the plurality of 2-D radar reflection points included in the radar data into the given three-dimensional coordinate system, the system can use the known height of the radar sensor (that is defined with reference to ground level) as the elevation estimate for each 2-D radar reflection point. In the cases where high-definition map information is available, the system can adjust the elevation estimate to account for the terrain of the scene surrounding the vehicle (e.g., the flatness of ground, the steepness of an upward or downward slope, etc.).

In other words, the fused point cloud includes three-dimensional points—a first set of 3-D data points derived from image data and a second set of 3-D data points derived from radar data—that correspond to reflections that would be identified by one or more scans of the scene by one or more different 3-D sensors capable of sensing the environment, e.g., a 3-D depth camera sensor, or a laser ranging device such as a LiDAR sensor, although only data collected using a camera sensor and a radar sensor is being used to generate this fused point cloud.

In some implementations, the point cloud data includes corresponding feature information of each of the first and second pluralities of three-dimensional data points that may be derived from the image data, the radar data, or both. In these implementations, the feature information of each first 3-D data point can include information about the color channels, object surface or texture characteristics, or any other properties measurable by using the camera sensor, or a combination thereof of the pixel that correspond to the first data point, while the feature information of each second 3-D data point can include information about the velocity measurement, or any other object motion properties measurable by using the radar sensor, or a combination thereof of the radar reflection point that correspond to the second data point. Additionally or alternatively, the respective outputs of the feature extraction subnetworks can be used as the feature information to be included in the point cloud data. In some of these implementations, modality coding may be added to distinguish between features. Specifically, the system can append a different binary code to the feature vectors of the first or second 3-D data points that encapsulates the feature information, e.g., with zero indicating camera features and one indicating radar features, to inform the downstream operations of the origin of the 3-D data points and their associated features.

Notably, the processes of generating the first and second pluralities of 3-D data points as well as their associated feature information may be independent from one another, and in some cases the generated fused point cloud may include only 3-D data points generated from one modality of sensor data, i.e., from either camera or radar data and not both. For example, in the case of camera sensor failure, by virtue of the joint 3-D space sensor fusion architecture that has been adopted, the system is still capable of generating a point cloud that may be used by an output neural network to compute a meaningful inference from processing the point cloud—despite the fact that this point cloud is not strictly "fused," but rather transformed into from the radar sensor measurement captured by one radar sensor.

The system processes the fused point cloud using an output neural network to generate a network output that characterizes the scene (step 316). In general, the output neural network can be any neural network that is configured to process point cloud data. In the example of FIG. 2, the output neural network is an object detection neural network, and the network output is an object detection output that identifies objects that are located in the scene. In this example, the object detection neural network can include a two-dimensional convolutional backbone neural network and a three-dimensional object detection neural network head that is configured to process the output of the backbone neural network to generate an object detection output that identifies locations of objects in the fused point cloud, e.g., that identifies locations of 3-D bounding boxes in the fused point cloud and a likelihood that each 3-D bounding box includes an object.

Figure 5:
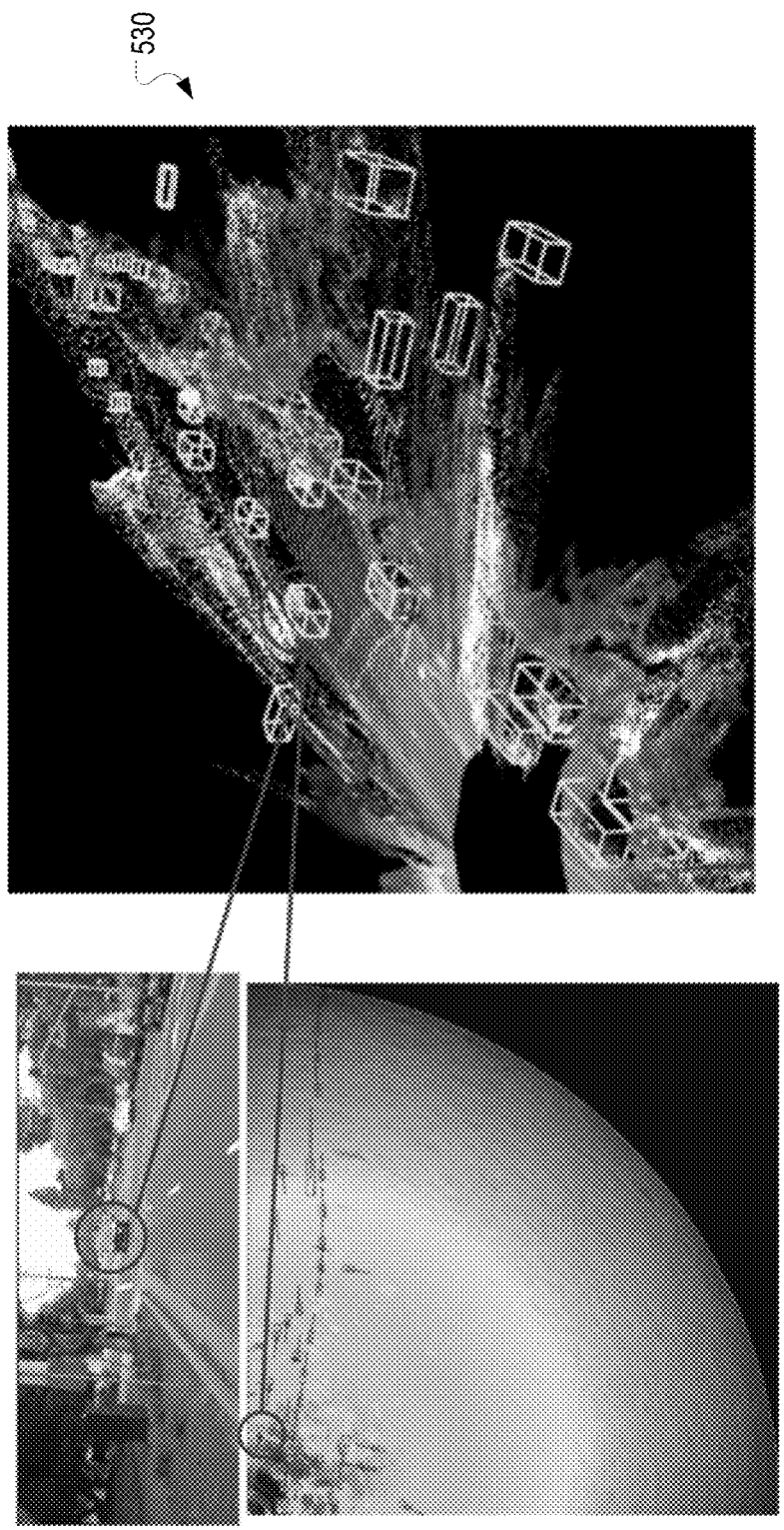
FIG. 5 shows example illustrations of a camera image, a radar point cloud, and an object detection output generated with reference to a fused point cloud, respectively.

FIG. 5 shows example illustrations of a camera image, a radar point cloud, and an object detection output generated with reference to a fused point cloud, respectively. As illustrated, the system obtains and processes image data 510 and radar data 520 that characterize the same scene of an environment to generate a fused point cloud 530 which is a three-dimensional representation of the scene of the environment. The system uses an output neural network configured as an object detection neural network to process the fused point cloud 530 to generate an object detection output that identifies locations of multiple 3-D bounding boxes in the fused point cloud 530. As shown in the circles, one of the 3-D bounding boxes defined with reference to the fused point cloud 530 identifies a vehicle that is present in the scene and that corresponds to the vehicle characterized in the image data 510 and radar data 520, respectively.

An example lightweight neural network that can be used as the output neural network is described in Sun, Pei, et al. "RSN: Range Sparse Net for Efficient, Accurate LiDAR 3D Object Detection." Proceedings of the IEEE/CVF Conference on Computer Vision and Pattern Recognition. 2021. Another example neural network that can be used as the output neural network is described in Lang, Alex H., et al. "Pointpillars: Fast encoders for object detection from point clouds." CVPR, 2019, which learns features on pillars (vertical columns) of a point cloud to predict 3-D bounding boxes for objects. However, depending on the actual implementations, the output neural network can generally have any appropriate architecture that maps the fused point cloud to a network output that characterizes the scene.

While the description of FIGS. 2-3 describes how to generate a fused point cloud from image data captured by using a single camera sensor and radar data captured by using a single radar sensor, the disclosed techniques are generalizable to more complex sensor fusion schemes. For example, there can be multiple camera sensors and multiple radar sensors, and the data captured by using these sensors can be similarly processed by the system to generate a fused point cloud that incorporates information from each of the camera and radar sensors.

Figure 6:
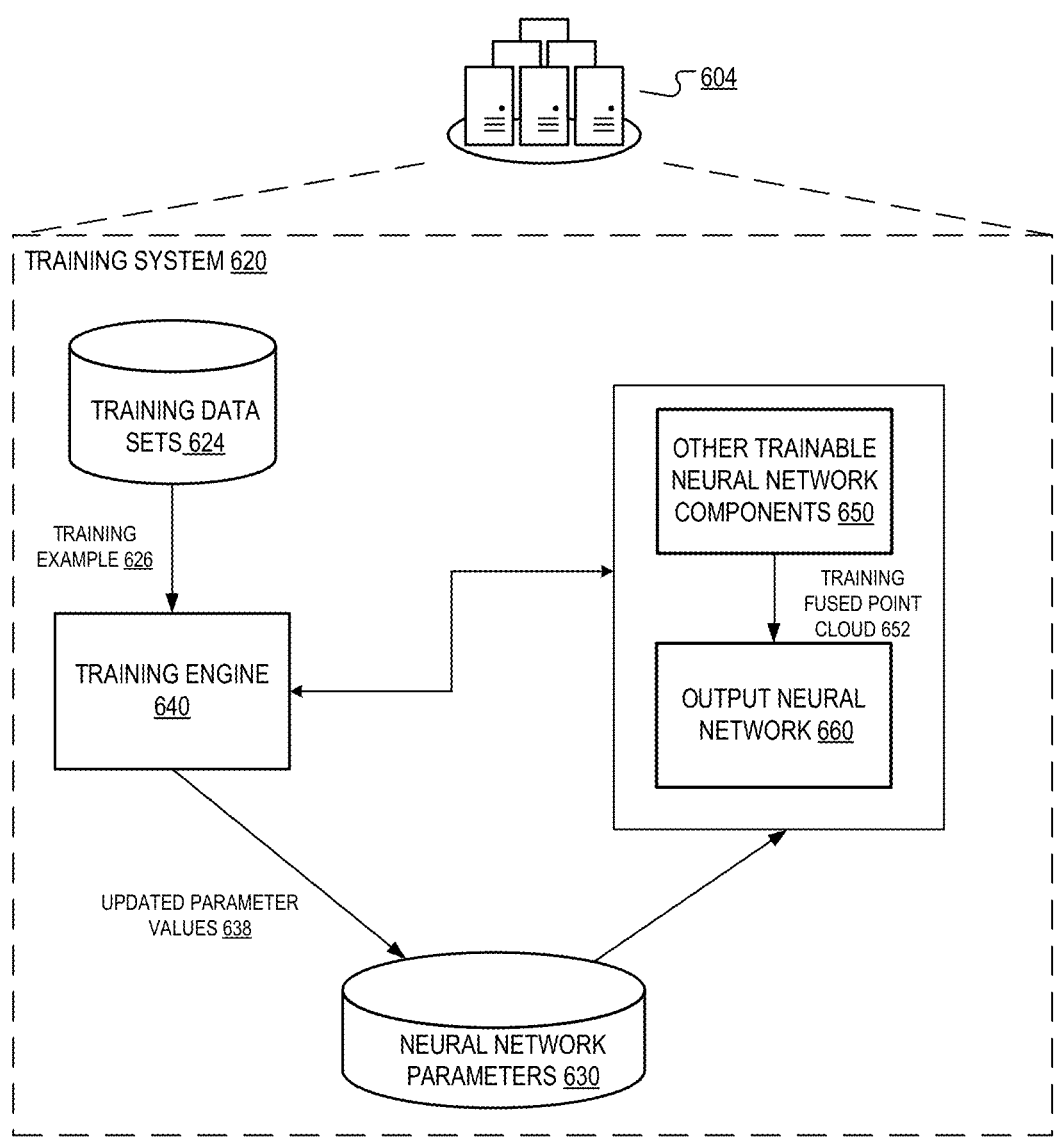
FIG. 6 shows an example training system.

FIG. 6 shows an example training system 620. The training system 620 is an example of a system implemented as computer programs on one or more computers in one or more locations in which the systems, components, and techniques described below are implemented.

To allow the output neural network 260 of FIG. 2 to more effectively perform the given appropriate machine learning task, e.g., to generate more accurate object detection or classification network outputs that characterizes the scene of an environment that is in the vicinity of the vehicle, the training system 620 can determine trained values of the parameters 630 of the output neural network.

In some implementations, the training can be end-to-end, where the parameter values of all trainable components of the system shown in FIG. 2 are jointly learned. That is, the training system 620 can train each of the neural network components that perform sensor fusion as described above with reference to FIGS. 2-3 jointly with the output neural network for any given appropriate machine learning task. In these implementations, the training system 620 includes respective instances of the different neural network components shown in FIG. 2—including the first and second neural networks (each of which in turn may include a feature extraction subnetwork and segmentations subnetwork), the depth prediction neural network, the fusion neural network, and the output neural network. A training instance of the neural network generally has the same architecture as the corresponding on-board neural network. While these neural network components may be implemented on-board a vehicle as described above, the training system 620 is typically hosted within a data center 604, which can be a distributed computing system having hundreds or thousands of computers in one or more locations.

The training system 620 trains the training instance of the output neural network 660 together with the other trainable neural network components 650 as mentioned above using a training dataset 624 that includes multiple training examples 626. As one example dataset that can be used by the training system 620, Sheeny, M., et al.: Radiate: A radar dataset for automotive perception in bad weather. In: 2021 IEEE International Conference on Robotics and Automation (ICRA). pp. 1{7. IEEE (2021)], describes a dataset that includes 3 hours of annotated radar imagery with more than 200K labeled objects for 8 categories, in addition to stereo images, 32-channel LiDAR, and GPS data.

Each training example 626 can include respective data representing camera and radar sensor measurements of a scene (e.g., a pair of camera images and radar radio frequency images that characterizes a same scene of an environment), and during each training iteration the output neural network 660 can process a training fused point cloud 652 that is generated by the other trainable neural network components 650 and to generate a training network output for the given machine learning task.

For each training example 626, the training system 620 uses a training engine 640 to compute a value of a loss function having one or more loss terms that evaluate a measure of difference between the training network output and a ground truth network output associated with the training example 626. The ground truth network output can generally be any target output that should be generated by the output neural network for the training example to perform the given appropriate machine learning task. For example, the loss function used for the training of these neural networks can include an object detection loss term that measures the quality of object detection outputs relative to the ground truth object detection outputs with respect to the point cloud data included in the training dataset, e.g., smoothed losses for regressed values and cross entropy losses for classification outputs. Particular of examples of various terms of the loss function that can be used for the training are described in Yan, Yan, et al. "Second: Sparsely embedded convolutional detection." Sensors, 18(10):3337, 2018 and Lang, Alex H., et al. "Pointpillars: Fast encoders for object detection from point clouds." CVPR, 2019.

In the implementations where the training is end-to-end, the training engine 640 can compute a loss function having additional terms that evaluate the performance of other neural network components configured to perform sensor fusion. For example, the loss function can include a term evaluating a pixel-wise focal loss for segmentation subnetworks, described in more detail at Lin, Tsung-Yi, et al. "Focal loss for dense object detection." In: Proceedings of the IEEE international conference on computer vision. pp. 2980{2988 (2017). As another example, the loss function can include a term that evaluates a pixel-wise L2 difference between the initial depth estimates generated by using the depth prediction neural network and ground truth depth values. To determine the ground truth values in this example, the training system can use either the depth information of various data points defined in the point cloud data representing the LiDAR sensor measurement of the scene, projected ground truth object detection labels associated with the image data (e.g., the 3-D projection of 2-D bounding boxes), or both.

The training engine 640 then computes a gradient of the loss function and generates updated parameter values 638 by using an appropriate machine learning training technique (e.g., a gradient descent with backpropagation training technique that uses a conventional optimizer, e.g., stochastic gradient descent, RMSprop, or Adam optimizer). The training engine 640 can generate updated parameter values 638 for the output neural network 660 and the other trainable neural network components 650. The training engine 640 then proceeds to update the collection of neural network parameters, including the parameters 630 of the output neural network, using the updated parameter values 638.

During training, the training system 620 can incorporate any number of techniques to improve the speed, the effectiveness, or both of the training process. For example, the training system can use layer normalization, batch normalization, or both to stabilize the training. As another example, the training system can utilize data augmentation techniques, such as random flipping or global rotation, to enhance the size and quality of existing training datasets. As yet another example, the training system adopts a sensor dropout mechanism to improve the robustness of the system against sensor failures that may potentially occur from time to time, after the system is deployed. Sensor data dropout during training will be described further below with reference to FIG. 6.

After training is complete, the training system 620 can provide the trained parameter values to the on-board system 100 for use in generating perception outputs that enable the generation of timely and accurate planning decisions by the planning subsystem 140. For example, the training system 620 provides, e.g., by a wired or wireless connection, the trained values of the neural network parameters, including the trained values of the output neural network parameters 630, to the on-board system 100.

Figure 7:
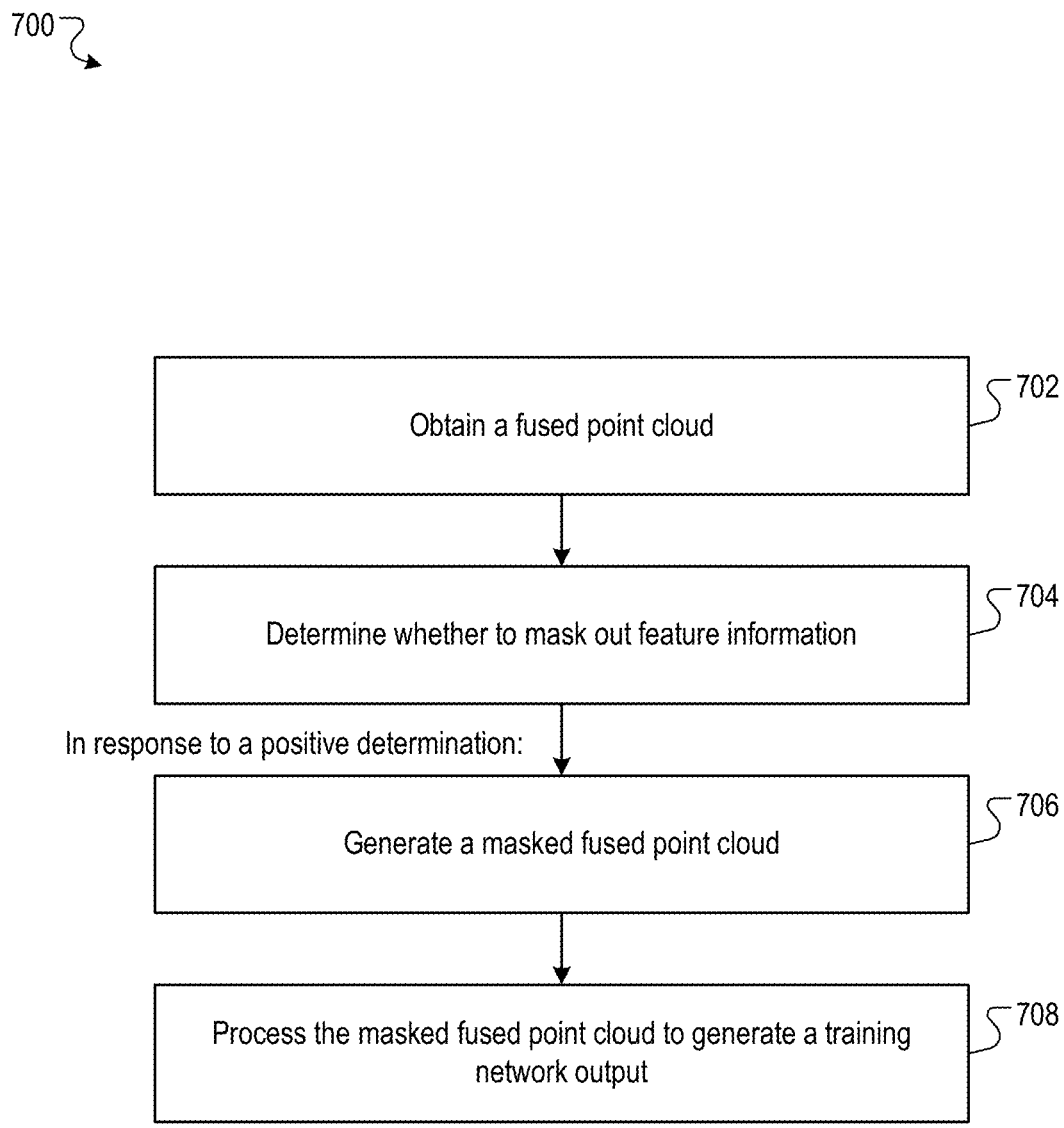
FIG. 7 is a flow diagram of an example process for training an output neural network.

FIG. 7 is a flow diagram of an example process 700 for training an output neural network. For convenience, the process 700 will be described as being performed by a system of one or more computers located in one or more locations. For example, a system, the training system 620 of FIG. 6, appropriately programmed in accordance with this specification, can perform the process 700.

The system obtains a fused point cloud that includes a first plurality of three-dimensional data points that correspond to image pixels and a second plurality of three-dimensional data points that correspond to radar reflection points (step 702). Each first 3-D data point in the fused point cloud is associated with feature information (e.g., that is encapsulated by a feature vector) that may be derived from the image data for the first 3-D data point. Likewise, each second 3-D data point in the fused point cloud is associated with feature information (e.g., that is encapsulated by a feature vector) that may be derived from the radar data for the second 3-D data point. The system can generate the fused point cloud from the image and radar data included in an obtained training example and by using the first neural network, the second neural network, the depth prediction neural network, and the fusion neural network, in accordance with their parameter values.

The system determines, in accordance with a predetermined dropout probability, whether to mask out feature information for either the first or the second plurality of three-dimensional data points included in the fused point cloud (step 704). In some implementations, the system can do this by sampling a number between zero and one with uniform randomness, and then determining whether the sampled number is greater than the predetermined dropout probability. In some implementations, at most one modality of feature information may be masked out at each iteration of process 700, and the system can sample multiple numbers and subsequently evaluate the sampled numbers using complementary criteria for different feature information modalities.

In response to a positive determination, the system generates a masked fused point cloud by masking out the feature information for either the first or the second plurality of three-dimensional data points (step 706). For example, in response to determining that the sampled number is smaller than the predetermined dropout probability, the system can mask out the feature information for the first plurality of 3-D data points by replacing the feature information associated with each first 3-D data point with predetermined numeric values (e.g., zero, negative or positive infinity, or the like). For example, the system can multiply a zero matrix with the feature vectors that encapsulate the feature information associated with the first plurality of 3-D data points.

The system processes the masked fused point cloud using the output neural network in accordance with current values of output network parameters to generate a training network output for a given machine learning task (step 708). In the implementations where the output neural network is configured to perform an object detection task, the training network output can be an output including 3-D bounding box data that identifies objects that are characterized by the fused point cloud. In particular, during training, the output neural network is trained to perform the machine learning task without having access to certain feature information associated with the fused point cloud that has been masked out. In this way the system trains the output neural network to improve its robustness against potential sensor failures.

The system determines an update to the current values of the output network parameters by determining a gradient with respect to the output network parameters of a loss function as described above with reference to FIG. 6. The system can also determine a respective update to current values of the first, second, depth prediction, and fusion network parameters based on the determined gradient of the loss function and by virtue of backpropagation.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining image data representing a camera sensor measurement of a scene captured by a camera sensor, the image data comprising a plurality of two-dimensional pixels;
    obtaining radar data representing a radar sensor measurement of the scene captured by a radar sensor, the radar data comprising a plurality of two-dimensional radar reflection points;
    processing the image data using a first neural network to generate as output a feature representation of the image data that comprises a respective image feature vector for each of the pixels;
    generating a respective initial depth estimate for each of a subset of the plurality of pixels;
    processing the radar data using a second neural network to generate as output a feature representation of the radar data that comprises a radar feature vector for each of the plurality of radar reflection points;
    for each of the subset of the plurality of pixels, generating a respective adjusted depth estimate for the pixel using the initial depth estimate for the pixel and the radar feature vectors for one or more corresponding radar reflection points;
    generating a respective elevation estimate for each of a subset of the plurality of radar reflection points;
    generating a fused point cloud that includes (i) a first plurality of three-dimensional data points, wherein each three-dimensional data point in the first plurality of three-dimensional data points corresponds to a respective one of the subset of pixels in the image data and has a depth value that is equal to the respective adjusted depth estimate for the corresponding pixel, and (ii) a second plurality of three-dimensional data points, wherein each three-dimensional data point in the second plurality of three-dimensional data points corresponds to a respective one of the subset of the plurality of radar reflection points and has an elevation value that is equal to the respective elevation estimate for the corresponding radar reflection point; and
    processing the fused point cloud using an output neural network to generate a network output that characterizes the scene.

2. The method of claim 1, wherein the output neural network comprises an object detection neural network and the network output is an object detection output that identifies objects that are located in the scene.

3. The method of claim 1, wherein the fused point cloud further comprises, for each of the first plurality of three-dimensional data points, corresponding feature information derived from the image data.

4. The method of claim 1, wherein generating the fused point cloud comprises transforming the subset of the plurality of pixels in the image data into three-dimensional coordinates in accordance with the respective adjusted depth estimates.

5. The method of claim 1, wherein generating the respective initial depth estimates comprises processing the image data using a depth prediction neural network that is configured to process the image data to generate as output the respective initial depth estimate of each of the plurality of pixels.

6. The method of claim 1, wherein the first and second neural networks each comprise a respective convolutional neural network.

7. The method of claim 1, further comprising generating a first mask that assigns each of the pixels to be either a foreground pixel or a background pixel, wherein the subset of the plurality of pixels includes only the foreground pixels.

8. The method of claim 1, wherein generating the respective adjusted depth estimate comprises, for each pixel in the subset of the plurality of pixels:
generating a plurality of candidate three-dimensional positions along a ray that is cast from the camera sensor to a three-dimensional position having spatial coordinates of the pixel and a depth equal to the initial depth estimate, wherein each candidate three-dimensional position specifies a respective candidate initial depth estimate for the pixel.

9. The method of claim 8, further comprising:
determining, as the one or more corresponding radar reflection points to be used to generate the respective adjusted depth estimate for the pixel, one or more radar reflection points that spatially map to each of the plurality of candidate three-dimensional positions by using the respective candidate initial depth estimate that is specified by the candidate three-dimensional position.

10. The method of claim 8, further comprising generating a second mask that assigns each of the plurality of radar reflection points to be either a foreground radar reflection point or a background radar reflection point, and wherein the one or more corresponding radar reflection points to be used to generate the respective adjusted depth estimate for the pixel include only the foreground radar reflection points.

11. The method of claim 8, wherein generating the adjusted depth estimate for the pixel further comprises, for each pixel in the subset of the plurality of pixels:
processing, using a fusion neural network, a fusion network input comprising the respective initial depth estimate for the pixel to generate a fusion network output that specifies the respective adjusted depth estimate for the pixel, wherein the fusion neural network is configured to generate the respective adjusted depth estimate for the pixel at least in part by applying an attention mechanism over the radar feature vectors for the one or more corresponding radar reflection points by using the image feature vector for the pixel to generate a query to be used in the attention mechanism.

12. The method of claim 11, wherein the fusion neural network is further configured to, for each pixel in the subset of the plurality of pixels:
use the image feature vector for the pixel to generate the query for the pixel to be used in the attention mechanism;
use the radar feature vector for each radar reflection point in the corresponding subset of the plurality of radar reflection points to generate a respective key for the radar reflection point to be used in the attention mechanism;
use the respective initial depth estimate and the plurality of candidate initial depth estimates for the pixel to generate respective values for the pixel to be used in the attention mechanism;
determine a corresponding attention weight for each respective value for the pixel by computing a product between the query for the pixel and each of the respective keys; and
generate the respective adjusted depth estimate for the pixel based on determining a weighted sum of the respective values for the pixel weighted by the corresponding attention weights for the respective values.

13. The method of claim 1, wherein generating the respective elevation estimate for each of the subset of the plurality of radar reflection points comprises generating the respective elevation estimate based on a height of the radar sensor, a terrain of the scene, or both.

14. The method of claim 1, wherein the fused point cloud further comprises, for each of the second plurality of three-dimensional data points, corresponding feature information derived from the radar data.

15. The method of claim 1, further comprising training the output neural network by:
obtaining a fused point cloud that includes a first plurality of three-dimensional data points that correspond to image pixels and a second plurality of three-dimensional data points that correspond to radar reflection points;
determining, in accordance with a predetermined dropout probability, whether to mask out feature information for either the first or the second plurality of three-dimensional data points included in the fused point cloud;
in response to a positive determination, generating a masked fused point cloud by masking out the feature information for either the first or the second plurality of three-dimensional data points; and
processing the masked fused point cloud using the output neural network in accordance with current values of output network parameters to generate a training network output for a given machine learning task.

16. The method of claim 15, further comprising:
determining an update to the current values of the output network parameters by determining a gradient with respect to the output network parameters of a loss function that includes a first term that depends on a difference between the training network output and a ground truth network output associated with the fused point cloud.

17. The method of claim 15, wherein masking out the feature information for the first plurality of three-dimensional data points included in the fused point cloud comprises, for each three-dimensional data point in the first plurality of three-dimensional data points:
replacing the feature information associated with data point with predetermined numeric values.

18. The method of claim 17, wherein the predetermined numeric value is zero.

19. The method of claim 15, wherein determining, in accordance with the predetermined dropout probability, whether to mask out feature information for either the first or the second plurality of three-dimensional data points included in the fused point cloud comprises:
sampling, with uniform randomness, a number between zero and one; and
determining whether the sampled number is greater than the predetermined dropout probability.

20. The method of claim 16, wherein obtaining the fused point cloud comprises generating the fused point cloud from the image and radar data using the first neural network, the second neural network, the depth prediction neural network, and the fusion neural network, and wherein the method further comprises:
  determining a respective update to current values of the first, second, depth prediction, and fusion network parameters based on the determined gradient of the loss function.

21. The method of claim 16, wherein the loss function further includes a second term that depends on a difference between the initial depth estimates generated by using the depth prediction neural network and ground truth depth values.

22. The method of claim 21, further comprising determining the ground truth depth values using:
  point cloud data representing a LiDAR sensor measurement of the scene captured by a LiDAR sensor, or
  ground truth object detection labels associated with the image data.

23. A system comprising one or more computers and one or more storage devices storing instructions that when executed by the one or more computers cause the one or more computers to perform operations comprising:
  obtaining image data representing a camera sensor measurement of a scene captured by a camera sensor, the image data comprising a plurality of two-dimensional pixels;
  obtaining radar data representing a radar sensor measurement of the scene captured by a radar sensor, the radar data comprising a plurality of two-dimensional radar reflection points;
  processing the image data using a first neural network to generate as output a feature representation of the image data that comprises a respective image feature vector for each of the pixels;
  generating a respective initial depth estimate for each of a subset of the plurality of pixels;
  processing the radar data using a second neural network to generate as output a feature representation of the radar data that comprises a radar feature vector for each of the plurality of radar reflection points;
  for each of the subset of the plurality of pixels, generating a respective adjusted depth estimate for the pixel using the initial depth estimate for the pixel and the radar feature vectors for one or more corresponding radar reflection points;
  generating a respective elevation estimate for each of a subset of the plurality of radar reflection points;
  generating a fused point cloud that includes (i) a first plurality of three-dimensional data points, wherein each three-dimensional data point in the first plurality of three-dimensional data points corresponds to a respective one of the subset of pixels in the image data and has a depth value that is equal to the respective adjusted depth estimate for the corresponding pixel, and (ii) a second plurality of three-dimensional data points, wherein each three-dimensional data point in the second plurality of three-dimensional data points corresponds to a respective one of the subset of the plurality of radar reflection points and has an elevation value that is equal to the respective elevation estimate for the corresponding radar reflection point; and
  processing the fused point cloud using an output neural network to generate a network output that characterizes the scene.

24. One or more computer storage media storing instructions that when executed by one or more computers cause the one or more computers to perform operations comprising:
  obtaining image data representing a camera sensor measurement of a scene captured by a camera sensor, the image data comprising a plurality of two-dimensional pixels;
  obtaining radar data representing a radar sensor measurement of the scene captured by a radar sensor, the radar data comprising a plurality of two-dimensional radar reflection points;
  processing the image data using a first neural network to generate as output a feature representation of the image data that comprises a respective image feature vector for each of the pixels;
  generating a respective initial depth estimate for each of a subset of the plurality of pixels;
  processing the radar data using a second neural network to generate as output a feature representation of the radar data that comprises a radar feature vector for each of the plurality of radar reflection points;
  for each of the subset of the plurality of pixels, generating a respective adjusted depth estimate for the pixel using the initial depth estimate for the pixel and the radar feature vectors for one or more corresponding radar reflection points;
  generating a respective elevation estimate for each of a subset of the plurality of radar reflection points;
  generating a fused point cloud that includes (i) a first plurality of three-dimensional data points, wherein each three-dimensional data point in the first plurality of three-dimensional data points corresponds to a respective one of the subset of pixels in the image data and has a depth value that is equal to the respective adjusted depth estimate for the corresponding pixel, and (ii) a second plurality of three-dimensional data points, wherein each three-dimensional data point in the second plurality of three-dimensional data points corresponds to a respective one of the subset of the plurality of radar reflection points and has an elevation value that is equal to the respective elevation estimate for the corresponding radar reflection point; and
  processing the fused point cloud using an output neural network to generate a network output that characterizes the scene.

* * * * *